3,008,540
DESICCATOR UNIT
Ernest O. Gibson, Jr., Tarzana, Calif., assignor to Wells Industries Corporation, North Hollywood, Calif., a corporation of California
Filed Oct. 7, 1959, Ser. No. 844,966
4 Claims. (Cl. 183—4.8)

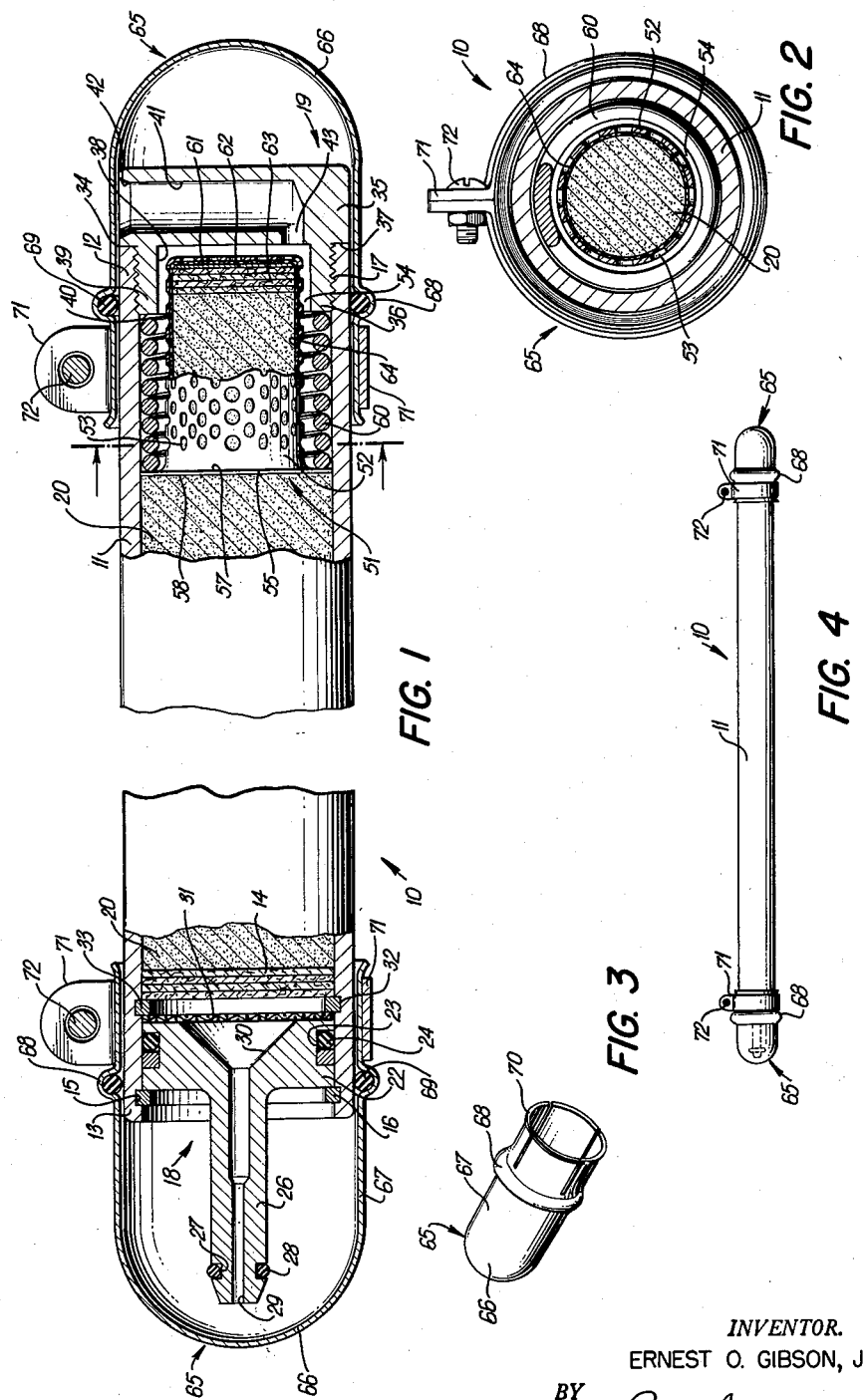
Nov. 14, 1961    E. O. GIBSON, JR    3,008,540
DESICCATOR UNIT
Filed Oct. 7, 1959
INVENTOR.
ERNEST O. GIBSON, JR
BY
R. E. Geangue
ATTORNEY United States Patent Office 3,008,540
Patented Nov. 14, 1961

The present invention relates to desiccator units in general and more particularly to a desiccator unit constructed and designed to be incorporated into a fluid system operating under pressure of many thousand pounds. More specifically, the invention comprises a desiccator unit in which a replaceable desiccant is packed within a high pressure resistance casing provided with means by which fluid conducting openings are formed in the opposite ends of a desiccant storage chamber to open it to the flow of fluid passing through the casing without contamination from the desiccant.

In many operations, it is desirable that a gas under pressure be free from moisture or a foreign undesirable gas or substance. The removal of moisture may be viewed as typical and in this disclosure will be discussed. For this purpose, a unit known as a desiccator unit is placed in the line of gas flow to remove from the gas stream the moisture or foreign gas. The unit generally employs a multiplicity of desiccator particles or granules which are confined in an area through which the gas stream must flow. At times the host gas may be under high pressure ranging, for example, from one to twenty thousand pounds per square inch or more. The desiccator unit must be able to operate under these conditions. Because a desiccant becomes exhausted after a period of operative use, it must be replaced. It is important that it remains sealed until actually placed in use in order that it may have minimum effectiveness and life.

In the past, difficulties have been encountered when employing desiccator units of conventional construction which stem largely from the fact that through vibration or shaking, the desiccant particles beat against each other and the walls of the unit so that a rather fine desiccant powder is generated and the size of the desiccant particles reduced. The reduction of the particle size permits the particles to more freely tumble in the unit so that even more powder is produced by the vibratory action. Another problem exists since the powdered desiccant combines with the stream of host gas and sometimes is passed into the gas system of the demoisturizing system. The presence of such powdered desiccant in the gas system causes contamination of the gas and operates to clog various openings or ports in the system and reduces the general efficiency of the demoisturizing system.

The desiccator unit constructed in accordance with the present invention is capable of functioning under extreme high pressures and is so constructed that the desiccant is maintained in a sealed condition in a unit casing. The unit of the present also prevents the tumbling or movement of desiccant particles so as to prevent particle powdering and furthermore, filtering means are provided for permitting the passage of the gas stream to the exclusion of any powdered desiccant which may be present.

Therefore, it is a primary object of the present invention to provide a desiccator unit for enclosing and storing a quantity of desiccant particles under loaded conditions so that the particles will not tend to tumble, pulverize or become powdered through vibratory or shaking action.

Another object of the present invention is to provide a novel desiccator unit for storing and confining a quantity of desiccant in particles or granular form in a restricted area through which a gas may pass and circulate without permitting the escape of desiccant into the gas input and output passages.

Still another object of the present invention is to provide a novel desiccator unit having a dynamic means for placing a constant pressure on the confined desiccant particles so that the individual particles are constantly urged against one another so that no area or space is provided into which the particles may tumble or pulverize to cause the powdering of the crystals by vibration or shaking.

A further object of the present invention is to provide a novel desiccator unit having dynamic means for minimizing desiccant particle powdering and having a filter means for permitting free gas passage and circulation to the exclusion of any desiccant powder or particles.

Other and further objects and advantages of this invention will become apparent as the detailed description proceeds in connection with the accompanied drawings of a preferred embodiment.

In the drawings:
FIGURE 1 is a longitudinal sectional view through a desiccator unit constructed in accordance with the present invention;
FIGURE 2 is a cross sectional view of the desiccator unit of FIGURE 1 taken in the direction of arrows 2—2;
FIGURE 3 is a perspective view of an end cap employed in the desiccator unit embodiment shown in FIGURE 1; and
FIGURE 4 is a reduced drawing of a side elevational view of the desiccator unit of FIGURE 1 showing the desiccator unit fully assembled and sealed.

Referring to the drawings and FIGURE 1 in particular, a desiccator unit constructed in accordance with the present invention is indicated generally by the reference character 10 and is seen to comprise an elongated hollow metal body 11, preferably cylindrical, sufficiently strong as to withstand high internal fluid pressures. Body 11 is of substantially constant wall thickness, having opposite ends 12 and 13, the latter being formed with an annular internal groove 15 a short distance from the body extremity for receiving a retaining snap ring 16 while end 12 is interiorly threaded at 17. End 13 of the body 11 is closed by a permanently positioned end closure member indicated generally by the reference character 18, while opposite end 12 is closed by a removable closure member indicated generally by the referenced character 19. Closure members 18 and 19 define the ends of a chamber in casing 11, in which is placed a plurality of desiccant particles indicated generally by the reference character 20.

Referring now in particular to end closure 18, that member is seen to comprise a wall-like body 22 circumferentially grooved at 23 to seat an O-ring sealing and back-up ring assembly 24, and formed centrally upon its exterior face with an elongated axially projecting probe 26. The probe is tapered on its free end and provided with an annular circumferential groove 27 which seats an O-ring 28 for effecting a sealed fluid-tight connection with a fluid conducting conduit (not shown) in a demoisturizing system. Body 22, including probe 26, is centrally bored at 29 to effect fluid passage from the casing chamber to the fluid conduit system. Adjacent the casing chamber, bore 29 in body 22 widens to form an enlarged central recess 30. The wall body 22 closely seats within the interior of the casing 11 whereby the O-ring sealing and backup ring assembly 24 provides a fluid-tight seal therebetween.

Upon the interface of body 22, there is provide in abutting relationship and covering recess 30, an annular metal filter screen 31 of relatively coarse mesh sufficient to prevent passage of desiccant particles. Adjacent the screen, a circumferential groove 32 is formed in the casing wall which receives a snap ring 33 to prevent filter 33 movement into the casing chamber.

Closure member 18 is prevented from longitudinal displacement from the end 13 of the body 11 by retaining means comprising the snap ring 16 expanded in place in the groove 15. It is, additionally, held against movement into the body 11 by the snap ring 33 expanded into its mating groove 32. Body 22 and the filter screen 31 are maintained in position within the casing and in engagement with each other by snap rings 16 and 33.

Situated between the desiccant particles 20 and the exposed portion of snap ring 33, there is provided a plurality of circular pads, such as pad 14, which preferably are fabricated from a porous material such as fibreglass for example. In the present instance, four such pads are shown which are arranged side by side. The pads are fabricated to permit the passage of a gas or fluid such as air; however, the pads substantially prevent the escape of powdered desiccant into the demoisturizing system. The pads are also soft and somewhat resilient so that the pads are capable of absorbing shocks and thereby serve as a damper means for the dessicant particles.

Removable closure member 19 closing the end 12 of casing 11 comprises a body 35 formed with an encircling channel 36 having external threads threadably engaged with the threads 17 provided on the end 12 of casing 11. In some instances it is desirable to seal end 12 of the casing to the body 35 and this sealing may be effected by silver soldering the annular joint 34 of the two parts about the exterior surface of the desiccator unit. Body 35 may be rotated so that the threads 17 properly engage and the body may be continued to be rotated until the end 12 of the casing closes channel 36 and forcibly engages an annular shoulder 37 of body 35 to achieve the joint 34. The inner face of body 35 is provided with an annular projecting extension 39 whose outer surface defines the depth of channel 36 and whose inner surface defines a central recess 38. The free end of the extension presents an annular face 40.

The main portion of body 35 is provided with an enlarged passageway 41 having an outlet port 42 for connection into the demoisturizing system. Within the main portion of body 35, a small passageway 43 is provided which connects and communicates passage 41 with recess 38 and hence the casing chamber.

Projecting into the annular recess 38 and arranged in fixed spaced relationship to the inner face of body 35, there is a sieve-like cup indicated generally by the reference character 51. The cup comprises, in general, a main body portion 52 which is provided with a plurality of holes, such as hole 53, and which is projected into the annular recess 38 so as to provide an encircling chamber 54 surrounding the projecting end of the portion 52. The end of the cup opposite to its projecting end is provided a bell shaped mouth or opening which includes a flange 55 having an outer face 57 and an inner face 58 engageable with the desiccant particles. The flange is of a diameter substantially equal to the diameter of the casing chamber so that desiccant particles or powder cannot escape or pass between the annular periphery of the flange and the casing body 11.

Surrounding the projecting body portion 52 of the cup and arranged in circumferential spaced relationship thereto, there is provided a resilient means, such as a coil spring 60, which is compressed between the outer face of the flange and the annular face 40 associated with body extension 39. The compression of the spring forcibly urges the cup to place a compressive load on the desiccant particles which are within the interior of the cup and in the casing chamber so that the individual particles are loaded against one another to minimize and eliminate spaces therebetween which through vibratory or shaking motion would normally cause powdering of the desiccant and reduction in desiccant particle size.

The projecting body portion 52 of the cup may have its extreme end 61 perforated or may be closed. If perforated, it has been found preferable to employ a circular disc 62 which is of a diameter equal to the inside diameter of the body portion 52 so that the circulation of air through any perforations or holes in the end 61 of the cup is prevented.

As suitable body represented by the general reference character 63 of gas-permeable closely-packed material such as fibreglass is positioned inside the projecting body portion 52 of the cup 51 and serves to prevent the desiccant particles 20, which may be powdered or granular, from filtering through the apertures in the end wall of the cup. An additional protection for preventing such granules or powdered particles from passing through the perforations in the central portion of the cup is provided by the employment of a liner 64 positioned adjacent the inner wall of the cup which is preferably made of a porous cloth, such as a nylon cloth of relatively close mesh for example.

The installation and construction of the desiccator unit of the present invention is a relatively simple operation. Construction is achieved by inserting the parts associated with casing end 13 from either end 12 or end 13. For example, filter pads 14 may be inserted first followed by the expansion of snap ring 33 into its associated groove 32 in the casing wall. Next, metal filter 31 is inserted into the casing adjacent the outer face of the expanded snap ring 33. Body 22 is positioned so that its inner face is engaged with the filter 31 and snap ring 16 is then expanded into the groove 15 so that body 22 and filter 31 are firmly held in position with probe 26 of body 22 extending beyond the furthest extremity of end 13 of casing 11.

Next, desiccant particles may be loaded into the casing chamber through end 12 followed by the insertion of cup 51 into the casing chamber. By working cup 51 against the loaded desiccant particles, the particles are packed in close relationship and are also forced into the interior of the cup against the pads 63 and the liner 64. However, liner 64 is fabricated so that the host gas may be passed. Flange 55 of the cup prevents escapement of desiccant particles from around the periphery of the cup. Next, spring 60 is positioned into the casing chamber via end 12 over the projecting body portion 52 of the cup so that its inner end engages outer face 57 of flange 55. Closure of end 12 is effected by threadably engaging the body 35 at 17 with the casing end 12 so that annular face 40 engages the outer face of spring 60. By rotating body 35, spring 60 further packs the desiccant particles within the casing chamber and places a constant or dynamic load upon the particles to take up any space within the casing chamber which would normally permit the free tumbling, rubbing or shaking of the particles. To effect a complete sealing of the unit, joint 37 may be silver-soldered.

Preferably, the packing and loading of the desiccant particles into the casing chamber should be under a pressurized atmosphere such as by employing nitrogen. Preferably, some nitrogen should be captured within the casing chamber so as to provide a slight pressure in the unit. In order to prevent the escape of the captured pressure and to prevent the contamination of the desiccant within the casing chamber by foreign gases, a pair of end caps represented by the general reference character 65 are provided on casing ends 12 and 13 respectively.

As shown in FIGURES 1 and 3, each end cap 65 comprises a dome-shaped end 66 having a central cylindrical body 67 into which an internal bead 68 is formed and terminating in several resilient fingers such as finger 70. Within the recess of the formed bead 68, there is provided an annular resilient O-ring 69. The depth of the bead 68 is slightly smaller than the diameter of O-ring 69 so that a portion of the O-ring extends into the interior of the cap to provide an interference fit with the outer surface of casing 11 during assembly. In this manner, both ends of the casing are effectively sealed against escapement of internal pressure or contamination of the desiccant by foreign gases. To insure efficient sealing of O-ring 69 with the outer surface of casing 11, a radial clamp 71 is drawn and fastened about the periphery of the plurality of finger 70 of the cap by a nut and bolt arrangement 72.

Therefore, it is seen that the desiccator unit constructed in accordance with the present invention provides a unit which prevents the free tumbling of desiccant particles so that the powdering or granulation of the particles is substantially prevented and, therefore, the purity of the host gas in a demoisturizing system is insured and maintained free from contaminates. Even though the desiccator unit may be subjected to vibratory or shaking forces, the damping means provided on each end of the stored desiccant will absorb any shocks which might tend to pulverize or powderize the desiccant. Furthermore, should, after installation and packing of the desiccant, spaces or blank areas appear within the casing chamber between particles, spring 60 acting upon the flange 55 of cup 51 will provide a dynamic loading force for continually compressing the desiccant particles together within the casing chamber.

While the particular apparatus herein shown disclosed in detail is fully capable of attaining the objects and providing the advantages hereinbefore stated, it is to be understood that it is merely illustrative of the presently preferred embodiment of the invention and that no limitations are intended to the details of construction or design hereinshown other than as defined in the appended claims.

What is claimed is:

1. A high pressure desiccator unit adapted for use in a gas line operating under thousands of pounds pressure, said unit comprising, a thick-walled casing having a central bore of uniform diameter adapted to house a supply of desiccant particles, a pair of closure members arranged within the central bore on opposite ends of the casing to seal the particles within the chamber, resilient damping means disposed between one closure member arranged on one end of the casing and the desiccant particles for absorbing unit shocks, an elongated perforated cup containing a portion of desiccant particles associated with the other closure member on the other end of the casing within the casing chamber disposed between the last mentioned closure member and the particles, an annular flange carried on one end of the cup having an inner face and an outer face, the flange outer face engageable with the desiccant particles, and resilient means disposed about the elongated cup compressed between the flange inner face of the cup and the last mentioned closure member for forcibly urging the cup including the flange thereof into engagement with the particles to place a dynamic load on the particles to effect the packing of the particles against one another whereby particle tumbling, rubbing and shaking within the casing chamber is avoided and eliminated.

2. A high-pressure desiccator unit adapted for use in a gas line operating at thousands of pounds pressure, said unit comprising, a thick-wall casing having a central chamber of uniform diameter adapted to receive a supply of desiccant particles, first and second removable closure members closing the opposite ends of said casing, an elongated perforated cup within the chamber holding a portion of desiccant particles in fixed spaced relationship to the first closure member, an annular flange carried on one end of the cup radially extending outwardly against the casing, the flange having an inner face and an outer face, the flange outer face engageable with the desiccant particles, and resilient means disposed within the casing chamber about the elongated cup compressed between the first closure member and the flange inner face of the cup for placing a dynamic load on the desiccant particles to effect the packing of the particles against one another whereby particle tumbling, rubbing and shaking within the casing chamber is avoided.

3. A high pressure desiccator unit as defined in claim 2 including resilient material disposed between the second closure member and the desiccant particles acting as a damper to absorb unit shocks to prevent particle powdering or granulation.

4. A high pressure desiccator unit adapted for use in a gas line operating under thousands of pounds pressure, said unit comprising, a thick-walled casing having a central chamber of uniform diameter adapted to house a supply of desiccant particles, a pair of closure members arranged within the central chamber on opposite ends of the casing to seal and retain the particles within the chamber, resilient damping means disposed between a first closure member of the pair and the desiccant particles for absorbing unit shocks, the damping means constructed and arranged to permit gas passage to the exclusion of desiccant particles or powder, a second closure member of the pair and having a continuous flange slidably engaged with the casing, an elongated perforated cup adapted to receive a portion of the desiccant particles, a gas pervious liner carried between the cup and the desiccant particles to prevent passage of particles through cup perforations, an annular flange carried on one end of the cup radially extending outwardly against the casing, the flange having an inner face and an outer face, the flange outer face engageable with the desiccant particles, and resilient means disposed about the elongated cup compressed between the cup flange and the second closure member for forcibly urging the cup including the flange into engagement with the particles to place a dynamic load on the particles to effect the packing of the particles against one another whereby particle tumbling, rubbing and shaking within the casing chamber and cup is avoided and eliminated.

References Cited in the file of this patent
UNITED STATES PATENTS

| 1,871,418 | McKee | Aug. 9, 1932 |
| 2,507,028 | Lockwood | May 9, 1950 |
| 2,593,132 | Gannon | Apr. 15, 1952 |
| 2,728,407 | Squier | Dec. 27, 1955 |
| 2,845,138 | Gageby | July 29, 1958 |